3,566,612
METHOD OF AGGLOMERATING
FROZEN PARTICLES
Hanns Eilenberg, Rosrath, and Franz-Josef Schmitz, Weiden, Germany, assignors to Leybold-Heraeus-Verwaltung GmbH, Cologne-Bayental, Germany
Filed Apr. 25, 1969, Ser. No. 819,306
Claims priority, application Germany, Apr. 25, 1968,
P 17 67 307.3
Int. Cl. C09c 1/60; F26b 13/30
U.S. Cl. 62—62          4 Claims

ABSTRACT OF THE DISCLOSURE

A frozen product is formed into particles of a desired size by passing it through apparatus which forms particles of the desired size while it is at a subatmospheric pressure which corresponds to the particular agglomeration temperature of the product being processed.

BACKGROUND OF THE INVENTION

This invention relates to the formation of frozen particles of a desired size, and more particularly to a method for agglomerating and forming the particles into the desired size while they are at a subatmospheric pressure.

Frozen products are often formed into a particular shape or size which is favorable for subsequent processing such as freeze-drying. Grinding is one favorite method for so forming the product into particles of a desired size. The particles formed may be used in many different ways. One use is to add the particles to a precooled extract to act as seeds about which larger particles can form. It has also been proposed to agglomerate the fine particles by momentary heating and to thereafter impart the desired grain size by grinding.

Such processes have various disadvantages. Repeated thawing and refreezing is undesirable since the quality of the product inevitably suffers. Grinding of agglomerated particles develops fine particles which must again be subjected to the agglomerating process and which become qualitatively inferior because of this repeated treatment.

SUMMARY OF THE INVENTION

It is an object of the present invention to provide a method by which fine particles can be formed by a single agglomeration process and direct subsequent granulation, in order to avoid repeated treatment and consequent reduction in quality of the product.

Briefly stated, these and other objects of the invention are accomplished by agglomerating the frozen particles and subjecting them to apparatus for forming them into granules of the desired size while they are inside a vacuum chamber and subjected to a subatmospheric pressure which corresponds to the agglomeration temperature of the product.

DESCRIPTION OF THE PREFERRED EMBODIMENTS

Figure 1:
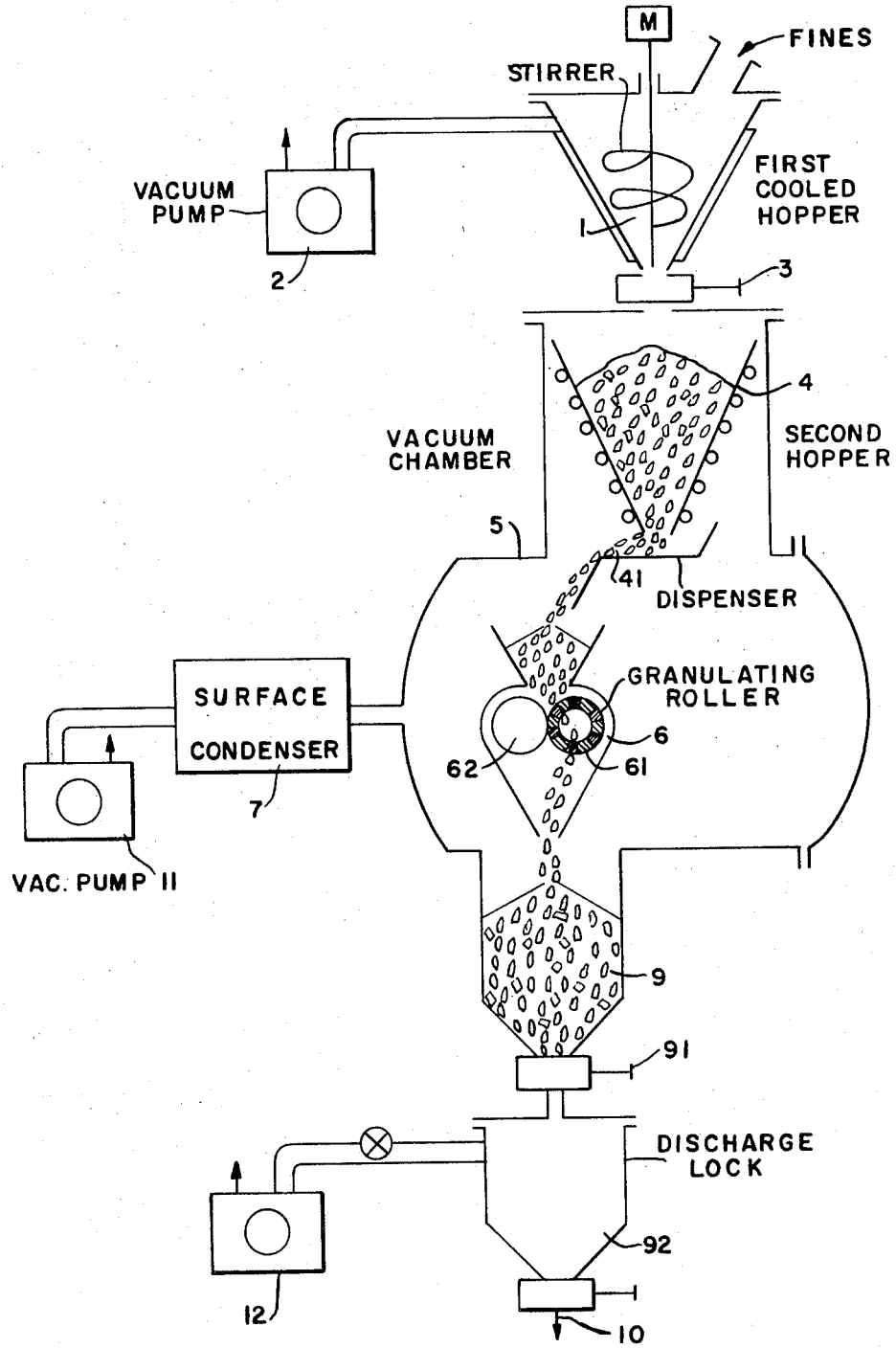
FIG. 1 is a schematic view showing a preferred embodiment of the apparatus for practicing the present invention. The fines are collected in a first cooled hopper 1 which is evacuable with a vacuum pump 2. A gate valve 3 is located at the bottom of hopper 1 which enables the communication between hopper 1 and second cooled hopper 4 located within the vacuum chamber 5. A dispenser 41 is arranged at the bottom of hopper 4, from which the product to be processed falls into the granulating device 6. The granulated product falls from the granulating device 6 into a collector 9 with gate valve 91 at its bottom. Gate valve 91 leads the granules to a discharge lock 92, which is connected with a vacuum pump 12 to provide a suitable vacuum within the discharge lock 92. Another gate valve 10 is located at the bottom of discharge lock 92 to enable discharging of the product processed from the device. The vacuum chamber 5 is connected with a surface condenser 7 and with a vacuum pump 11.
Figure 2:
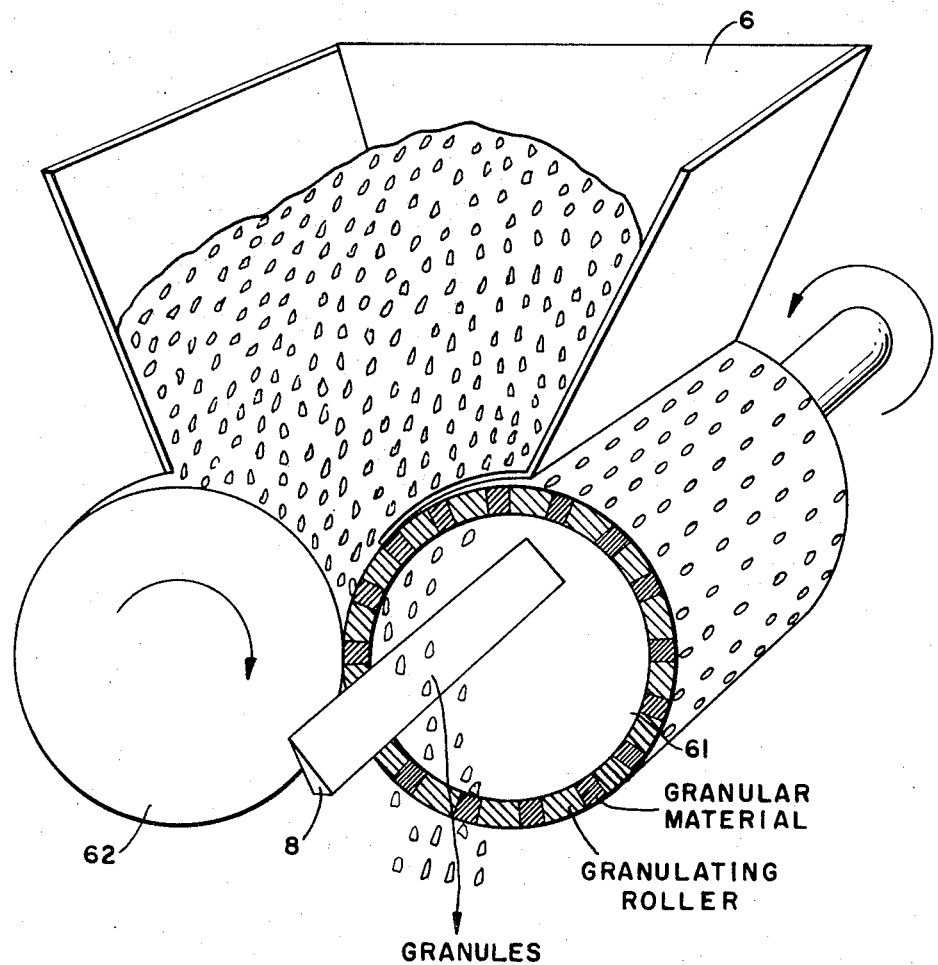
FIG. 2 is a schematic view showing the granulating device 6 and the rollers 61, 62 in detail.

Referring now to FIG. 1, the present method of the invention is practiced with apparatus including a first cooled hopper with a vacuum pump 2, within which the material to be agglomerated and granulated is collected. Through gate valve 3 these materials are fed to cooled hopper 4 located within the vacuum chamber 5 after having closed the inlet opening of hopper 1 and produced a vacuum by vacuum pump 2 within the hopper 1 corresponding to the vacuum maintained in the vacuum chamber 5. A dispenser device is located on the bottom of hopper 4, from which the material is passed to the granulating device 6 between granulating rollers 61, 62. The rollers 61, 62 rotate in opposite directions (see FIG. 2) and both rollers are driven by a motor, not shown, in the drawing. The roller 61, the granulating roller, is a hollow metal cylinder, for example, of aluminium, with an open frontside and a lot of openings in its cylindrical surface which correspond to the desired grainsize of the particles to be formed. Agglomeration on granulation of the material to be processed takes place at the same time as the particles are compacted and passed through the openings or apertures of the granulating roller 61. These openings will be passed by the materials to be granulated. The material passing through the openings of roller 61 will be cut off by knife 8 located in the hollow metal cylinder of roller 61. Roller 61 has a preferred outside diameter of 110 mm., and roller 62, which is a full metal cylinder, a diameter of approximately 90 mm. It is stated that these figures are examples only and other diameters can be chosen if necessary. After having passed the openings in roller 61 and cut off by knife 8 the particles now in the preferred range are accumulated in collector device 9 with a gate valve 91 on the bottom. The granulated product falls through gate valve 91 into the discharge lock 92, which is connected to a vacuum pump 12, with which the subatmospheric pressure of vacuum chamber 5 is to maintain in discharge lock 92, too. A gate valve 10 is located on the bottom of discharge lock 92 through which the particles can be removed for subsequent processing.

A subatmospheric pressure is maintained in vacuum chamber 5 by a vacuum forming apparatus including a surface condenser 7 and a vacuum pump 11. The pressure within the vacuum chamber 5 may be held to a desired level by adjusting the surface temperature of the condenser, as for example by adjusting a throttle valve, not shown in the drawing, controlling the input of cooling fluid to the condenser.

This method makes use of the fact that each product has some particular temperature at which the thawing process begins when it is in its frozen state. This temperature can also be called the agglomerating temperature since at this temperature fine particles will unite to form larger particles. If the vapor pressure curve showing the particular pressure at which the product freezes at particular temperatures is consulted, the agglomeration temperature of a product acn be set to be constant, by adjusting the pressure within the vacuum chamber 5 to conform to that temperature. Particles brought between the two rollers 61 and 62 therefore agglomerate because of the compression forces exerted upon them by the rollers. Consequently, they are discharged from the granulating rollers 61 as a granulate with a desired grain size which is determined by the size of its openings.

Thereafter, the particles can be removed from the discharge lock 92 by any suitable device. The additional heat generated by the compression forces of the two rollers causes no further thawing of the product due to the pressure in the vacuum chamber. The excess heat is removed from the product particles by the discharge of vapor components to the condenser 7.

The advantages of the method according to the present invention are therefore to be seen in that repeated agglomeration procedures of the type required in prior art processes carried out under atmospheric pressure are eliminated.

The invention will now be described by reference to the following specific examples:

EXAMPLE 1

Liquid coffee-extract with a solid content of 45% is prefrozen in a continuous working well known cooling device down to a temperature of —5° C. The extract leaves the device and enters freezing dishes which are brought into a freezing room which remains at a temperature of —45° C. After having completely frozen the precooled product within a freezing time of at least two hours, the dishes are emptied and the product prebroken and milled in a well known milling device. The milled frozen product passes several screening devices to separate the coarser particles and the fines from the preferred range of the final product size wanted. This final product size may be, with regard to coffee, in the range of 0.5 to 1.6 mm. particle size. The coarser particles are transferred back and milled again.

The fines which are smaller but 0.5 mm. are sometimes in the range of 20 to 30% of the throughput. These fines are collected and transferred to the following process:

The fines are collected in the first cooled hopper 1, which then is evacuated with a vacuum pump 2 to an operating pressure of 500 microns. Then gate valve 3 is opened and the fines fall down into the second hopper 4, which is located within vacuum chamber 5 on the top of granulating device 6. Within vacuum chamber 5 is maintained a pressure of 500 microns, which corresponds with a temperature of —24° C. Through the outlet of the second hopper 4 the fines are transferred by dispenser 41 into granulating device 6. The granulating device consists of two rollers 61, 62, from which the roller 62 is a full material metal roller. The roller 61 is a one side open cylinder with openings on its cylindrical surface which gives the final product size. The roller 62 rotates clockwise and the roller 61, counterclockwise, driven by a not shown motor. The fines enter the space between the two rollers and in this position they are compressed and pushed through the openings in roller 61. During the compression of the fines between rollers 61, 62 the pressure and the corresponding temperature increases so that the fines melt partially on their outside and stick together. The increase of pressure and temperature decreases immediately after the product has passed the openings of roller 61 and the partially liquidized product is frozen again. In this stage of the process parts of the water vapour, approximately 17%, are taken off and condensed on the surface of condenser 7. After having passed the openings in roller 61, the product is scraped off by an installed knife 8 and leaves the rotating roller 61 in the particle size determined by the openings, at least between 0.5 to 1.6 mm. and is collected in a collector device 9 which is connected with a gate valve 91 and a discharge lock 92 to outlet 10.

The throughput of the device described above is in the range of 100 kg./h.

EXAMPLE 2

Tea-fines with a solid content of 16% are granulated in the same way at a pressure of 800 microns, that is approximately a temperature of —20° C.

EXAMPLE 3

Orange juice with a solid content of 14% is granulated in the same way at a pressure of 150 microns, that is approximately a temperature of —36° C.

In a modified process the frozen product is milled completely down to particles less than 1 mm. Nothing is screened out and the whole so produced product is treated in the granulating device described above.

In the first tests the openings in roller 61 are cylindrical holes. This produces granulations which consist of small cylindrical granules similar to those known in the plastic industry. Because of marketing requests for final products which appear to be broken, irregular granules, openings are alternatively of triangular and square forms. Such installations make it possible to produce irregular granules devised for food industries.

The size of the openings in roller 61 corresponds to the final granular size desired. It may be—according to the examples given above—between 0.5 to 1.6 mm.

It will be understood that the above description of the present invention is susceptible to various modifications, changes and adaptations.

What is claimed is:
1. A method for agglomerating fine solid particles of a frozen product to form a larger particle of a desired particle size, comprising:
   feeding the frozen particles into an enclosed chamber,
   compacting the particles and passing them through an aperture of the desired size while maintaining their temperature at their agglomeration temperature by a subatmospheric pressure in the enclosed chamber.
2. The method of claim 1 wherein the compacting of the particles is effected between rollers, at least one of which is a hollow metal cylinder with an open frontside and with openings in its cylindrical surface corresponding in size to the desired particle size.
3. The method of claim 1 wherein the subatmospheric pressure is varied to control the temperature of the particles at their agglomeration temperature.
4. The method of claim 3 wherein the enclosed chamber is a vacuum chamber having a vacuum-forming condenser attached thereto, the subatmospheric pressure is within the vacuum chamber and the temperature of the condenser is varied to vary said subatmospheric pressure.

References Cited

UNITED STATES PATENTS

| | | | |
|---|---|---|---|
| 2,887,718 | 5/1959 | Curran et al. | 264—13 |
| 3,431,655 | 3/1969 | Grover et al. | 62—74X |
| 3,477,137 | 11/1169 | Van Gelder | 34—5 |

WILLIAM E. WAYNER, Primary Examiner

U.S. Cl. X.R.

34—92; 62—74; 264—117